July 6, 1965  J. L. FISCHER  3,193,125
THERMOPLASTIC MOLDED NIPPLE AND PACKAGE
Filed Dec. 31, 1963
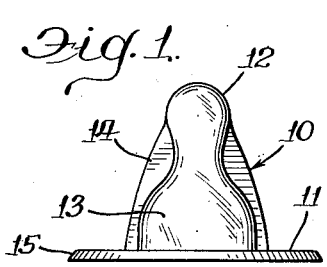
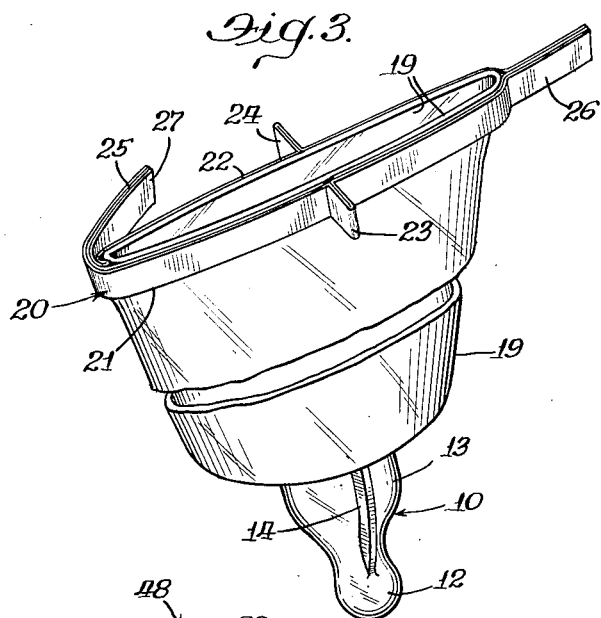
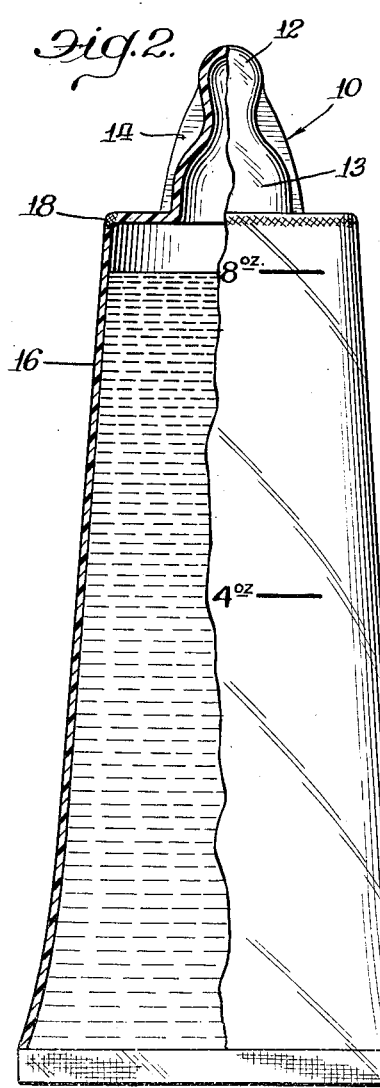
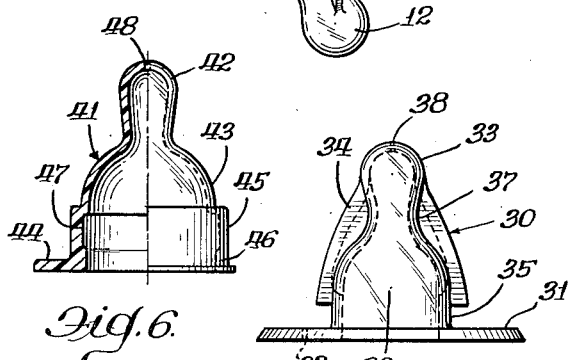
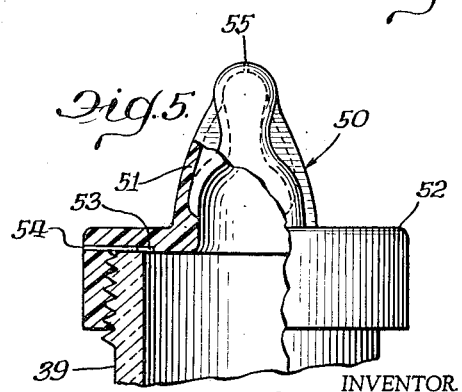
INVENTOR.
John L. Fischer
BY James J. Fawcett
Atty.

3,193,125
THERMOPLASTIC MOLDED NIPPLE
AND PACKAGE
John L. Fischer, Arlington Heights, Ill., assignor to The Kendall Company, Boston, Mass., a corporation of Massachusetts
Filed Dec. 31, 1963, Ser. No. 334,696
17 Claims. (Cl. 215—11)

This invention is concerned with elastic thermoplastic molded and formed disposable nursing nipples, with such nipples with integral mechanical fastening means, and with disposable fillable thermoplastic containers and prefilled packages incorporating such nipples and made integral therewith by heat sealing or fusion.

Heretofore, nursing nipples for babies have been made of cured rubber and synthetic rubbers which, although highly successful, have been relatively expensive because of the slowness of manufacture. An additional drawback of such nipples has been that they could not be made integral with the container and this required, except for the pull-over variety, a separate means of attachment usually in the form of a collar. Because of the expense of providing the various components of these nipple packages they have been habitually resterilized and used again and again. But their preparation for reuse is a tedious repetitive experience from which mothers everywhere have hoped for emancipation.

Recently, in response to this obvious unfulfilled need, various products have come on the market comprising a throw-away container either of glass or plated metal in which presterilized liquid baby food is protected by a sealed pry-off or screw-cap cover which must be removed and replaced by a pull-over nipple or a nipple with separate attaching collar. In one commercial development a sterile nipple is sealed with an attaching collar in a plastic bubble which latter is taped over the end of a can of sterile baby food so that the can end is kept sterile. It is necessary to expose the sealed end, pierce the can with a sterile instrument, snap the nipple and collar in place and remove the plastic bubble.

These recent introductions are undoubtedly of some benefit in relieving mothers' baby feeding problems but the nipple is still the cured rubber nipple which has hitherto been too expensive to throw away as these products suggest. What is needed are nipples which can be produced by much faster methods and which will have the nursing properties but not the price of traditional rubber nipples.

It is an object of this invention to produce disposable thermoplastic nipples which have nursing properties comparable to cured rubber nipples but which can be made by very fast techniques such as by extrusion molding, injection molding, and vacuum (or pressure) molding.

It is a further object to produce such disposable thermoplastic nipples with integral attaching means such as screw threads or snap-on flanges.

It is a still further object to produce integral disposable sterile nipple bearing containers for liquid baby foods which may be filled and sealed in the home or which alternatively may be furnished prefilled in sterile form.

In the past because of the necessity for resterilization under household conditions, nipples were required to be capable of withstanding repeated submersion in boiling water or hot steam. But disposable nipples may be sterilized by commercial methods not normally available to householders which while entirely effective are much less stringent so far as the material being sterilized is concerned.

I have found that a number of materials, most of which for one reason or another are incapable of satisfying the specifications for boilable nipples, may be made without curing techniques into excellent nipples if the latter are sterilized by one of these less stringent methods and then maintained in sterile condition until use. Since these nipples are truly disposable, no problem of subsequent sterilization exists.

Referring to the drawings:

FIGURE 1 illustrates a typical nipple of this invention.

FIGURE 2 illustrates a typical filled package of the invention in which the nipple of FIGURE 1 is sealed to the top of a piece of tubing to form a container which is sealed at the bottom after filling.

FIGURE 3 is a variation of the container illustrated in FIGURE 2 in which a mechanical sealing means is provided.

FIGURE 4 is a variation of the nipple of FIGURE 1 made to be substituted for a typical rubber nipple of the type which is locked to the bottle top by a collar through which it projects.

FIGURE 5 illustrates a typical nipple of the invention with an integral fastening screw-on collar.

FIGURE 6 illustrates a typical nipple of the invention of the pull-over type.

Those thermoplastics which when formed into 50 mil sheets and bent 180° return substantially to their original flat state within 5 seconds are generally suitable for the products of this invention.

These materials are subsequently molded in accordance with the invention to produce nipples which are self-supporting, soft and easily compressible. Such nipples rapidly regain their original shape following the strain induced during infant feeding.

The required elasticity and compressibility characteristics may be illustrated and defined by the following test performed on an Instron Tensile Tester:

Two nipples are placed horizontally one on each side between parallel jaws comprising a top jaw 1 inch wide and a bottom jaw ¼ inch wide so as to be equidistant from a central point of suspension. The nipples must be placed perpendicular to the jaws which must extend beyond the nipples at the sides. The tip of each nipple must extend beyond the rear edge of the lower jaw not more than ⅛ inch. The top jaw is connected to the movable crosshead of the machine while the lower jaw is attached directly to the sensing cell by a rod which slides in a bearing centrally located in the top jaw. The nipples are held with the minimum compression which will prohibit their falling from the jaws. The machine is adjusted to squeeze the nipples at a rate of 5 inches per minute, over a distance of ¼ inch from the above minimum compression position. The dynamic compression range for two suitable nipples is from 200 grams minimum to 2000 grams maximum as recorded under the described conditions. After the crosshead has moved ¼ inch it stops and the jaws maintain compression on the nipples. With the crosshead stopped, the static compression is now indicated as a somewhat reduced value of the dynamic compression. This difference between static compression and dynamic compression appears to be a function of the nipple material with more resilient materials having a lesser difference.

The machine is now adjusted to reverse the cross-head and return to its original position at 5 inches per minute. The recorded relaxation slope is then compared to the recorded compression slope with the y axis along the chart movement direction and without regard to sign. The relaxation slope should be measured along that portion of the curve from the static compression point to a point midway to complete relaxation. The compression slope should be measured along the compression portion of the curve from points opposite those used in determining the relaxation slope. Nipples are suitable which are between the ratios of 1:1 and 2:1, relaxation slope to compression slope. The optimum slope relationship is 1 to 1.

If a nipple as manufactured has a maximum dynamic compression by this test greater than 1000 g., the wall thickness is too great. If the maximum dynamic compression is less than 100 g., the wall thickness must be increased. These changes must be made by altering the dimensions of one or more mold parts where injection or extrusion molding is the method of forming utilized. If vacuum (or pressure) molding is utilized the thickness of the starting film should be altered to modify the finished nipple thickness in the same direction.

Where the nipple is to be made integral with a fastening collar, the latter need not be made of the nipple material. A thermoplastic connector, either snap-or or threaded, may, for instance, be fused or heat sealed to the nipple either while the latter is being formed or thereafter.

Likewise, the entire container illustrated in FIGURES 2 and 3 with the exception of the mechanical sealing device of FIGURE 3 may be of the nipple material and may be made simultaneously therewith either in tubular or other elongated shape. It is preferred, however, that a somewhat more rigid thermoplastic material such as polyethylene which may be performed, for instance, by continuous extrusion be used as the body portion of the container. Other liquid containers coated with thermoplastic material in the area to which the nipple is to be attached, may be substituted. The nipple again may be injection molded or formed directly on to the different preformed body by methods such as those illustrated in the Strahm U.S. Patent No. 2,713,369 issued July 19, 1955, or similar methods or it may be heat sealed thereto afterward.

Referring once more to the drawings:

FIGURE 1 illustrates a typical nipple 10 of the invention with a base 11, a rounded tip 12, a bulbous chamber 13 and side fins 14. The side fins are optional as is the beveled edge 15 which facilitates heat sealing.

FIGURE 2 illustrates the nipple of FIGURE 1 fused to a tube 16 as at 18 preferably by using a preformed extruded tube as a sleeve around the male portion of an injection mold and casting the nipple directly onto the tube. The tube may be filled with liquid and sealed by heat-seal 17. Sterilization of the inside of the package and the contents may be accomplished prior to sealing or the entire package may be placed in a bacteria impervious envelope and sterilized therein.

FIGURE 3 shows the nipple of FIGURE 1 fused to a tube 19 but this tube differs from that of FIGURE 2 in that it has a mechanical sealing means 20 for closing the open end of the tube. The device 20 consists of two strips 21 and 22 of adhesive tape into which two ears 23 and 24 are formed by folding the tape so that the adhesive is face-to-face. One of the adhesive strips 22 is adherent to the bottom edge of the tube 19 by means of its adhesive. The other adhesive strip 21 has a strip of heavy aluminum foil 25 along its edge adjacent the bottom of tube 19. This strip may be located at any point on the tape width. The uncovered adhesive of tape 21 is adherent to the tube 19. An aluminum wire may be substituted, if desired, for the aluminum strip. The tape strips and the aluminum strip or wire extend beyond the tube and are adhered together in this area to form retaining ears 26 and 27. In practice, after the tube is filled and closed, the ears 23 and 24 are flattened against the adjacent tape. The end of the package is then rolled about closing device 20 by rotating the latter by means of the retaining ears 26 and 27. When the device has at least a half turn and preferably a full turn of tube material over it, the retaining ears 26 and 27 are bent over the covering portion of the tube to retain the folds in place.

In FIGURE 4 a typical nipple 30 of the invention suitable for attachment by well-known collar means is shown. This type nipple has its base 31 pressed between the collar and the bottle or other container to which it is attached. In this well-known manner of attaching nipples the bulbous chamber 36, the tip 33, the waist 37 and the fins 34 (if there are fins) project through the central hole of the collar which fits more or less snugly around the portion 35 of the nipple and presses the base 31 between the bottom of the collar flange and the container. Where the nipple has fins, notches to accommodate passage of the fins may be included as part of the collar hole. A nipple which is separable from the container would generally be supplied with a feeding hole 38 and if the container is non-collapsible with a vent holt 32 but these may be inserted at any time.

In FIGURE 6 is illustrated a typical nipple 41 of the invention of the snap-over type which is presently well known in rubber nipples. The bulbous portion of this nipple 43 is generally enlarged to accommodate wider mouth bottles. Generally there is an annual recess 47 which snaps over and accommodates a fitting flange on the bottle or other container. Attached to the cylindrical base 45 is a tab 44 which aids in removing and applying the nipple to the container. The feeding hole 48 may be placed in the tip 42 at any time. Venting is normally achieved by means of a vertical inwardly-projecting small rib which extends from top to bottom of the recess 47 but other venting means may be utilized.

In FIGURE 5 an integral nipple and collar 50 is shown attached to the top of a bottle 39. Again the ribs 51 are optional. On the particular embodiment illustrated, the integral nipple and collar are of the same material but the nipple may be injection molded to a collar of different material by well-known methods. The feeding hole 55 may be made at any time. The cylindrical base 52 on this particular embodiment has a vent hole and groove 54 which leads into a slightly enlarged venting area 53 but other venting means may be substituted.

It is to be understood that the nipple of FIGURE 1 may have its base heat sealed to thermoplastic coatings on non-thermoplastic materials such as cardboard or metal or even glass but preferably it is heat sealed or fused to a plastic container.

In determining the thickness for nipples made in accordance with this invention, the pliability of the material should be taken into consideration. Materials which in the same thickness as nipple rubber are less pliable should be made thinner than similar rubber nipples and if a material should be used which is as flexible as rubber then a rubber mold would have the proper nipple wall thickness. Most nipples vary in wall thickness being thinnest at the end of the tip where the softer materials might measure about .022 inch thick and gradually increasing to about the center of tip ball to .040 to .045 inch then decreasing to about .030 inch at the waist and then thickening again to .060 to .065 inch in the half inch above the base. The thickness of the base is rather arbitrary and where the base is to be heat sealed to a flat rigid surface it could be quite thin. Otherwise the thickness range employed in rubber nipples is satisfactory.

The following examples of suitable nipples are illustrative of the invention:

*Example I*

Pellets of vinyl acetate-ethylene copolymer (25 to 40% vinyl acetate-75-60% ethylene) were plasticized by heat. The melted material was extruded directly into a closed nipple mold. The material solidified as it cooled and the mold was opened. The nipples formed thereby had dynamic compressions averaging 300 to 400 grams and were suitable in every way as nursing nipples, after vent and feed holes were provided.

*Example II*

The material of Example I was formed into sheets by suitable means such as extrusion, calendering, or casting.

After heat softening, one or more thicknesses of film were vacuum (or pressure) molded into the shape desired as, for instance, a nipple with an integral attaching collar. After being provided with a feed hole (the vent is molded in) the device was attached to the receiving flange of a fluid container and functioned as a satisfactory composite feeding device.

*Examples III and IV*

Pellets of methylacrylate-ethylene copolymer (Polyeze, Spencer Chemical Company, Dwight Bldg., Kansas City 5, Mo.) (10%–30% alkylacrylates) were plasticized and substituted in Examples I and II for the material of those examples. The nipples were entirely satisfactory.

*Examples V and VI*

Pellets of polyvinyl chloride, plasticized by adding 20–40% phthalic acid esters (DOP or equivalent), were substituted in Examples I and II with excellent nipples resulting.

*Examples VII and VIII*

Pellets of polyurethane (Estane 5740X2, B. F. Goodrich Chemical Co., 3135 Euclid Ave., Cleveland, Ohio) were plasticized and substituted in Examples I and II with substantially equivalent results.

The above nipples may be sterilized in the package by the use of ethylene oxide gas which passes through the pores of the package. For that reason peelable porous paper wrappers similar to those used in the gas sterilization of surgical dressings are preferred. However, the nipples of this invention may be sterilized in less porous or even impervious containers by the use in the container of liquid solutions of ethylene oxide gas in water and alcohol. Where filled containers are prepared in sterile condition, it may be desirable to sterilize the liquid by heat methods and then insert it into the sterile container under aseptic conditions before sealing the latter. Other well-known low temperature methods of sterilization may be utilized, however, such as electron beam sterilization.

I claim:

1. An elastically compressible soft resilient molded thermoplastic baby nipple comprising an outwardly extending heat-sealable base member and unitary therewith and centrally disposed thereon, a hollow upstanding teat including an enlarged portion next adjacent said base, a bulbous tip portion farthest removed from said base and an intermediate neck-like portion between said tip portion and said enlarged portion, said teat including two integral outwardly projecting longitudinally extending diametrically opposed rib-like members, said tip portion having a dynamic compression in the range of 100 to 1000 grams when compressed transversely in a ¼ inch band and rapidly regaining its original shape when said compression is released.

2. The nipple of claim 1 wherein the material thereof is a copolymer of vinyl acetate and ethylene.

3. The nipple of claim 1 wherein the material thereof is a copolymer of methacrylate and ethylene.

4. The nipple of claim 1 wherein the material thereof is a plasticized polyvinyl chloride.

5. The nipple of claim 1 having an integral means as the sole means for fastening it directly to a container.

6. The nipple of claim 5 wherein the integral means is fused to the thermoplastic portion of a container.

7. The nipple of claim 5 wherein the integral means is a female threaded portion.

8. The nipple of claim 5 wherein the integral means is a cylindrical snap-on collar.

9. The nipple of claim 5 wherein the integral means is a different material than the teat of said nipple.

10. The nipple of claim 1 being an integral portion of a sealed thermoplastic container containing liquid.

11. The nipple of claim 1 being an integral portion of a fillable and sealable container.

12. The nipple of claim 11, wherein the container is heat sealable.

13. The nipple of claim 1 in sterile condition in an internally sterile sealed container.

14. The nipple of claim 10 wherein the container and contents are sterile and are contained in an internally sterile outer container.

15. The nipple of claim 11 wherein the container is sterile and contained in an internally sterile outer container.

16. The nipple of claim 13 in which the internally sterile sealed container is a peelable envelope.

17. The nipple of claim 1 wherein the material thereof is a urethane polymer.

References Cited by the Examiner

UNITED STATES PATENTS

| | | | |
|---|---|---|---|
| 3,097,757 | 7/63 | Searer | 215—11 |
| 3,112,837 | 12/63 | Manoyian | 215—11 |
| 3,117,874 | 1/64 | Horan | 215—11 |
| 3,143,429 | 8/64 | Swanson et al. | 215—11 |

FRANKLIN T. GARRETT, *Primary Examiner.*